United States Patent [19]
Briat et al.

[11] Patent Number: 5,626,666
[45] Date of Patent: May 6, 1997

[54] MILLING AGENT FOR CEMENTS

[75] Inventors: Jean Briat, Saint Marcel; Catherine Fontaine, Chambourcy, both of France

[73] Assignee: Ciments Francais, Puteaux, France

[21] Appl. No.: 639,818

[22] Filed: Apr. 29, 1996

Related U.S. Application Data

[62] Division of Ser. No. 501,673, Jul. 12, 1995, abandoned.

[30] Foreign Application Priority Data

Jul. 13, 1994 [FR] France ................... 94 08715

[51] Int. Cl.$^6$ ......................................... C04B 7/52
[52] U.S. Cl. ..................... 106/728; 106/729; 106/748
[58] Field of Search .................... 106/728, 729, 106/748

[56] References Cited

U.S. PATENT DOCUMENTS 4,432,801   2/1984   Teglacchi et al. ................ 106/92

FOREIGN PATENT DOCUMENTS 0232202   8/1987   European Pat. Off. .
1425822   2/1976   United Kingdom .

*Primary Examiner*—David Brunsman
*Attorney, Agent, or Firm*—Lowe, Price, LeBlanc & Becker

[57] ABSTRACT

A cement milling agent characterized in that it is composed essentially of sugar-syrup derivatives prepared by oxidizing and hydrogenating said sugar syrups.

8 Claims, No Drawings

MILLING AGENT FOR CEMENTS

This application is a division of Application Ser. No. 08/501,673 filed Jul. 12, 1995 now abandoned.

The present invention concerns a milling agent to separate the cement grains and to grind the cement, this agent being based on sugar-syrup derivatives.

Milling agents are products used to improve grinding by circumventing particle clumping by using electrostatic-charge neutralization.

It is already known to make use of glycols, amines and their salts, alcohols, lignosulfonates and fatty acids and their salts as milling agents.

The use of glucose-syrup derivatives and in particular of derivatives prepared by hydrogenating or oxidation of polysaccharides is known in the form of mortar concretes and concrete admixtures. Be it borne in mind that such an admixture is an additive employed for mortar concretes and admixtures to improve their properties by matching them to the particular applications. Illustratively such concrete admixtures may be used as fluidizers, water-lowering agents, air entrainers, setting retarders or accelerators.

Such a concrete admixture is described in the French patent 2,957,473, the object of which is catalytic oxidation of the di-, tri-, oligo- and poly-saccharides into polyhydroxycarboxylic oxylic acids. The products obtained from this procedure are used in hydraulic binders as fluidizers, water-lowering agents, air entrainers, setting retarders or accelerators.

The FOSROC patent 1,425,822 describes polysaccharide oxidation to prepare a water-reducing agent for concrete admixtures.

The GRACE patent 4,423,801 describes a concrete admixture prepared by oxidizing liquid glucose syrups.

Lastly the KAO SOAP patent 4,073,658 describes a product prepared by hydrogenating polysaccharides and evincing water-lowering properties when used as a concrete admixture prepare by oxidizing liquid glucose syrups.

The object of the present invention is a milling agent prepared frown a sugar-syrup hydrogenation of oxidation product and offering the advantage of easier cement-grain separation and improved cement grinding.

The invention relates to a milling agent for cements which is characterized in that it is essentially based on sugar-syrup derivatives.

The sugar-syrup derivatives are prepared by oxidizing or hydrogenating said sugar syrups.

Said milling agent prepared from sugar-syrup derivatives is used in proportions by weight of active ingredient relative to the cement ranging from 0.01 to 1% and preferably between 0.015 and 0.25 %.

Moreover said milling agent is especially effective with cinder-containing cements and it may be combined with other known milling agents.

In one implementation of the invention, the milling agent is prepared by oxidizing polysaccharides into polyhydroxycarboxylic acid or by hydrogenating polysaccharides into oligosaccharide hydrolysates.

Furthermore the invention is remarkable in that said milling agent is based on glucose-syrup derivatives.

The invention is elucidated below in relation to illustrative tests.

Table 1 shows laboratory tests wherein the grinder is a closed receptacle in which the material granulometry is a function of grinding time. The parameters being compared are the grinding time (equivalent to the energy used up) and the granulometry of the ground product. The granulometry criterion used is the BLAINE specific surface of the (French) standard NF P 15,476. In this laboratory testing, the grinding results obtained in the absence of milling (test 1), further grinding results obtained using a conventional agent such as amines, ethanol amines or ethanol amine acetates (test 2), on one hand, are compared with the grinding results obtained using milling agents of the invention, that is, oxidized derivatives (test 3) and hydrogenated derivatives of sugar-syrup derivatives (test 4) when preparing Portland cement (CPA) composed of at least 97% clinker, the remainder being fillers.

Table 2 shows a test run on an industrial grinder in the form of an open pipe entered by the starting material which exits in ground form. The parameters being compared are the grinder output (equivalent to the energy used up) and the granulometry of the ground product as defined by the BLAINE specific surface. In this test the action of a conventional milling agent such as amines, ethanol amines or ethanol amine acetates is compared with the action of a milling agent of the invention, that is, with an oxidized sugar-syrup, regarding the preparation of a clinker cement (CLK) containing 80 % cinder and 20% clinker.

Table 2 proves, lessening of grinding time using the milling agents of the invention (tests 3 and 4) relative to grinding without milling agents (test 1), slight lessening of grinding time using milling agents of the invention (tests 3 and 4) relative to a conventional milling agent (test 2).

Table 2 proves that at equal grinding outputs (the same power consumption kwh/ton), identical BLAINE specific surfaces will result when using a conventional milling agent or one of the invention.

This result corroborates the milling nature of the oxidized sugar syrups and of the hydrogenated sugar syrups. In fact the milling agents of the invention are slightly superior to the conventional ones.

Furthermore, when using the stated proportions of milling agents, the W/C ratio (water to cement by weight) is observed to drop and thus there is a water-lowering effect at constant workability (measured under standard P 18,452), this feature already having been described and corroborated; further there is an increase in mechanical strength (concerning compression $R_c$ and bending $R_f$ at early times, namely 1 and 2 days).

Lastly the various tests corroborate that the milling agent of the invention avoids clumping of the cement particles into small balls and also averts cladding the grinder inside. This agent of the invention may be used alone in aqueous solution or it may be mixed with other milling agents and it was found especially effective for cinder-containing cements.

TABLE 1

| | CPA 55 CEMENT Laboratory Grinding | | | |
|---|---|---|---|---|
| TESTS | 1 | 2 | 3 | 4 |
| Milling Agent | none | Conventional | Oxidized glucose syrup | Hydrogenated derivatives |
| Active-ingredient proportion (ppm) | — | 150 | 180 | 180 |
| Grinding time | 120 | 115 | 105 | 108 |
| BLAINE surface (cm²/g) | 3,540 | 3,580 | 3,450 | 3,500 |
| Grinding-time gain | — | 4.2% | 12.5% | 10% |

TABLE 2

| Industrial Tests CLK cement | | | |
|---|---|---|---|
| Milling agent | Conventional | Oxidized sugar syrup | |
| Active ingredient proportion (ppm) | 175.2 | 195 | |
| Grinder output (ltr/h) | 18 | 18 | |
| SO₃ content | 4.22 | 4.39 | |
| BLAINE surface (cm²/g) | 4,030 | 4,030 | |
| W/C | 0.5 | 0.5 | 0.48 |
| Onset of setting | 5 h 10 min | 6 h 00 min | 5 h 40 min |
| End of setting | 6 h 10 min | 7 h 05 min | 7 h 10 min |
| Workability | 4 | 2.8 | 4 |
| Rf 1d | 0.4 | 0.5 | 0.4 |
| RC 1d | 1.1 | 1.3 (+18%) | 1.5 (+36%) |
| Rf 2d | 1.1 | 1.5 | 1.6 |
| RC 2d | 4.3 | 5.4 (+25.6%) | 5.6 (+30%) |
| Rf 7d | 4.9 | 4.5 | 5.3 |
| RC 7d | 27.4 | 26.8 (−2%) | 27.0 (−1.5%) |
| Rf 28d | 7.2 | 8.2 | 7.7 |
| RC 28d | 35.3 | 34.1 (−3.4%) | 36.9 (+4.5%) |

We claim:

1. A method of milling a cement, which method comprises:

milling the cement using a milling agent consisting essentially of a sugar-syrup derivative prepared by oxidizing or hydrogenating said sugar syrup.

2. The method according to claim 1, using 0.01 to 1% of the milling agent relative to the cement.

3. The method according to claim 2, using 0.015 to 0.25% of of milling agent relative to the cement.

4. The method according to claim 1, wherein the cement is a cinder-containing cement.

5. The method according to claim 1, using an additional milling agent.

6. The method according to claim 1, wherein the milling agent is prepared by oxidizing a polysaccharide into a polyhydroxycarboxylic acid.

7. The method according to claim 1, wherein the milling agent is prepared by polysaccharide hydrogenation into an oligosaccharide hydrolysate.

8. The method according to claim 1, wherein the milling agent is a glucose-syrup derivative.

* * * * *